United States Patent
Chin et al.

(10) Patent No.: US 9,084,151 B2
(45) Date of Patent: Jul. 14, 2015

(54) SIGNAL MEASUREMENT IN TD-SCDMA MULTICARRIER SYSTEMS USING DOWNLINK SYNCHRONIZATION CODES

(75) Inventors: Tom Chin, San Diego, CA (US);
Guangming Shi, San Diego, CA (US);
Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 12/910,419

(22) Filed: Oct. 22, 2010

(65) Prior Publication Data

US 2011/0274001 A1 Nov. 10, 2011

Related U.S. Application Data

(60) Provisional application No. 61/332,019, filed on May 6, 2010, provisional application No. 61/354,345, filed on Jun. 14, 2010.

(51) Int. Cl.
*H04W 24/10* (2009.01)

(52) U.S. Cl.
CPC .................................. *H04W 24/10* (2013.01)

(58) Field of Classification Search
USPC .................. 370/252, 330, 332, 334; 455/517
See application file for complete search history.

(56) References Cited

U.S. PATENT DOCUMENTS

| | | | |
|---|---|---|---|
| 2006/0014538 A1 | 1/2006 | Yuan | |
| 2006/0072567 A1* | 4/2006 | Casaccia et al. | 370/389 |
| 2009/0190547 A1 | 7/2009 | Shi et al. | |
| 2009/0207811 A1* | 8/2009 | Zhu et al. | 370/332 |
| 2010/0254353 A1* | 10/2010 | Jalali | 370/334 |
| 2011/0076999 A1* | 3/2011 | Kazmi et al. | 455/423 |
| 2011/0086662 A1* | 4/2011 | Fong et al. | 455/517 |
| 2011/0122794 A1* | 5/2011 | Kim et al. | 370/252 |

FOREIGN PATENT DOCUMENTS

| WO | 2009112928 A2 | 9/2009 |
|---|---|---|
| WO | WO2010016680 A2 | 2/2010 |

OTHER PUBLICATIONS

International Search Report and Written Opinion—PCT/US2011/035430, ISA/EPO—Sep. 29, 2011.
Taiwan Search Report—TW100115835—TIPO—Nov. 14, 2013.

* cited by examiner

*Primary Examiner* — Albert T Chou
(74) *Attorney, Agent, or Firm* — Kristine U. Ekwueme

(57) ABSTRACT

Wireless communication in a multicarrier radio access network may be implemented where a user equipment (UE) maintains communication with various carrier frequencies in the multicarrier network. The UE will receive an indication from a node B to measure a signal quality on one of a number of carrier frequencies in the network. The UE will then measure the signal quality on the carrier frequency based on measurements using a downlink synchronization code transmitted by the node B on the downlink pilot channel of the carrier frequencies in the multicarrier network. The UE may then report the channel quality back to the node B.

32 Claims, 6 Drawing Sheets

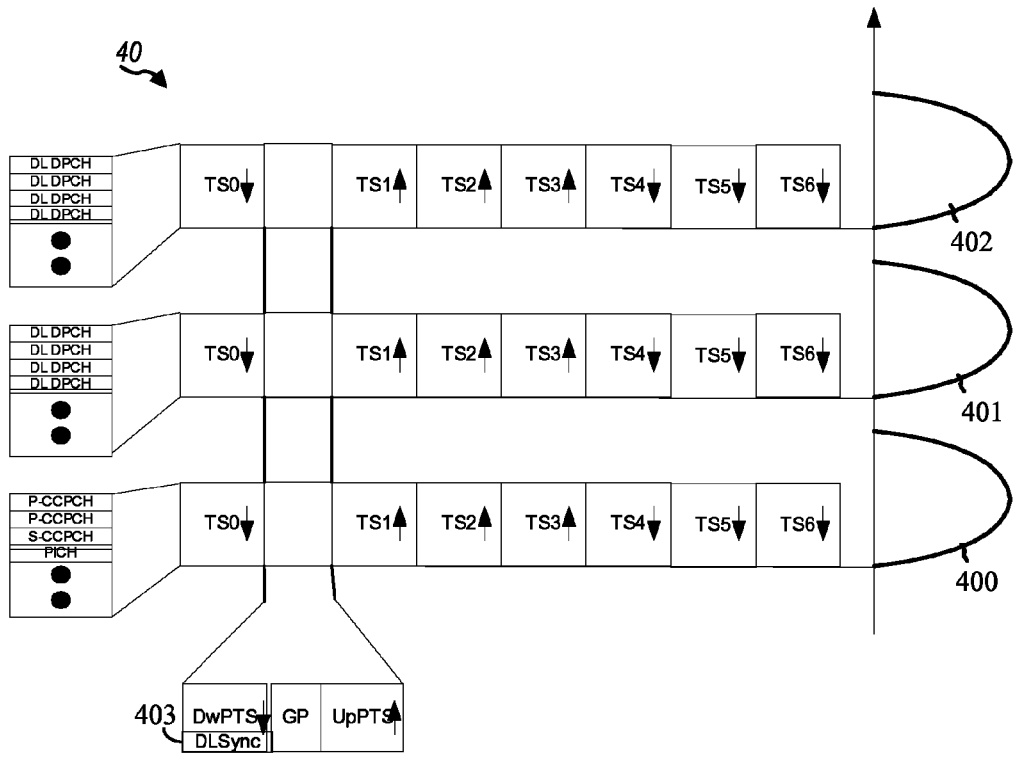
FIG. 4
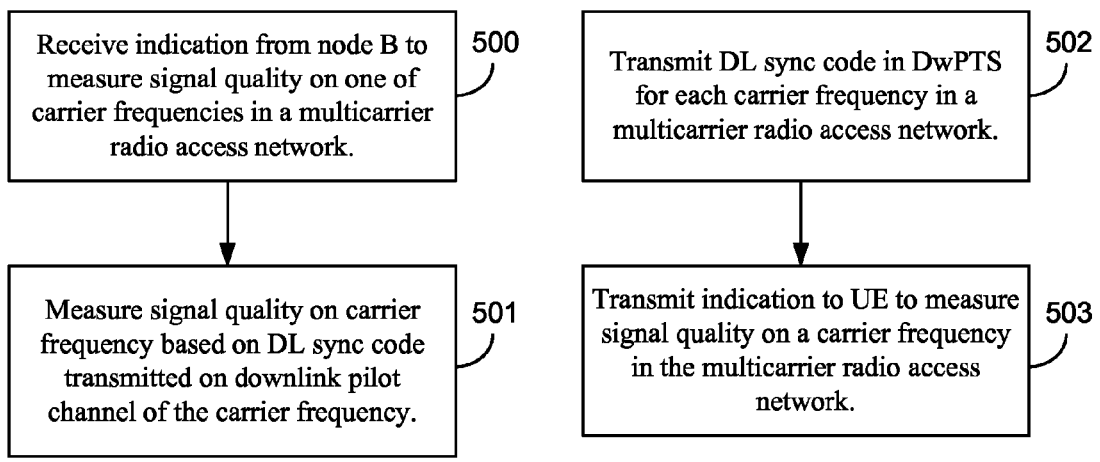
FIG. 5A
FIG. 5B

SIGNAL MEASUREMENT IN TD-SCDMA MULTICARRIER SYSTEMS USING DOWNLINK SYNCHRONIZATION CODES

CROSS REFERENCE TO RELATED APPLICATION

This application claims the benefit of both U.S. provisional patent application No. 61/332,019 filed May 6, 2010, in the names of CHIN et al., and U.S. provisional patent application No. 61/354,345 filed Jun. 14, 2010, in the names of CHIN et al., the disclosures of which are expressly incorporated by reference in their entireties.

BACKGROUND

1. Field

Aspects of the present disclosure relate generally to wireless communication systems, and more particularly, to signal measurements in Time Division-Synchronous Code Division Multiple Access (TD-SCDMA) multicarrier systems using downlink synchronization codes.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method for wireless communication in a multicarrier radio access network includes receiving an indication from a node B to measure a signal quality on one of a number of carrier frequencies in the network. The method also includes measuring the signal quality on the carrier frequency using the downlink pilot channel.

In another aspect of the disclosure, a User Equipment (UE) configured for wireless communication in a multicarrier radio access network includes means for receiving an indication from a node B to measure a signal quality on one of a number of carrier frequencies in the network and means for measuring the signal quality on the carrier frequency using the downlink pilot channel.

In another aspect of the disclosure, a computer program product includes a computer-readable medium having program code recorded thereon. The program code includes code to receive an indication from a node B to measure a signal quality on one of a number of carrier frequencies in a multicarrier radio access network and code to measure the signal quality on the carrier frequency using the downlink pilot channel.

In another aspect of the disclosure, a UE configured for wireless communication includes at least one processor and a memory coupled to the processor. The processor is configured to receive an indication from a node B to measure a signal quality on one of a number of carrier frequencies in a multicarrier radio access network and to measure the signal quality on the carrier frequency using the downlink pilot channel.

In one aspect of the disclosure, a method for wireless communication in a multicarrier radio access network includes transmitting a downlink (DL) synchronization code on a downlink pilot channel of each carrier frequency in the multicarrier radio access network. The method also includes transmitting an indication to a UE to measure a signal quality on one of the carrier frequencies.

In another aspect of the disclosure, a node B configured for wireless communication in a multicarrier radio access network includes means for transmitting a DL synchronization code on a downlink pilot channel of each carrier frequency of the multicarrier radio access network and means for transmitting an indication to a UE to measure a signal quality on one of the carrier frequencies.

In another aspect of the disclosure, a computer program product includes a computer-readable medium having program code recorded thereon. The program code includes code to transmit a DL synchronization code on a downlink pilot channel of each carrier frequency of the multicarrier radio access network and code to transmit an indication to a UE to measure a signal quality on one of the carrier frequencies.

In another aspect of the disclosure, a node B configured for wireless communication includes at least one processor and a memory coupled to the processor. The processor is configured to transmit a DL synchronization code on a downlink pilot channel of each carrier frequency of the multicarrier radio access network and to transmit an indication to a UE to measure a signal quality on one of the carrier frequencies.

BRIEF DESCRIPTION OF THE DRAWINGS

FIG. 4 is a block diagram conceptually illustrating carrier frequencies in a multi-carrier TD-SCDMA communication system.

FIG. 5A is a functional block diagram conceptually illustrating example blocks executed by a UE to implement one aspect of the present disclosure.

FIG. 5B is a functional block diagram conceptually illustrating example blocks executed by a node B to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
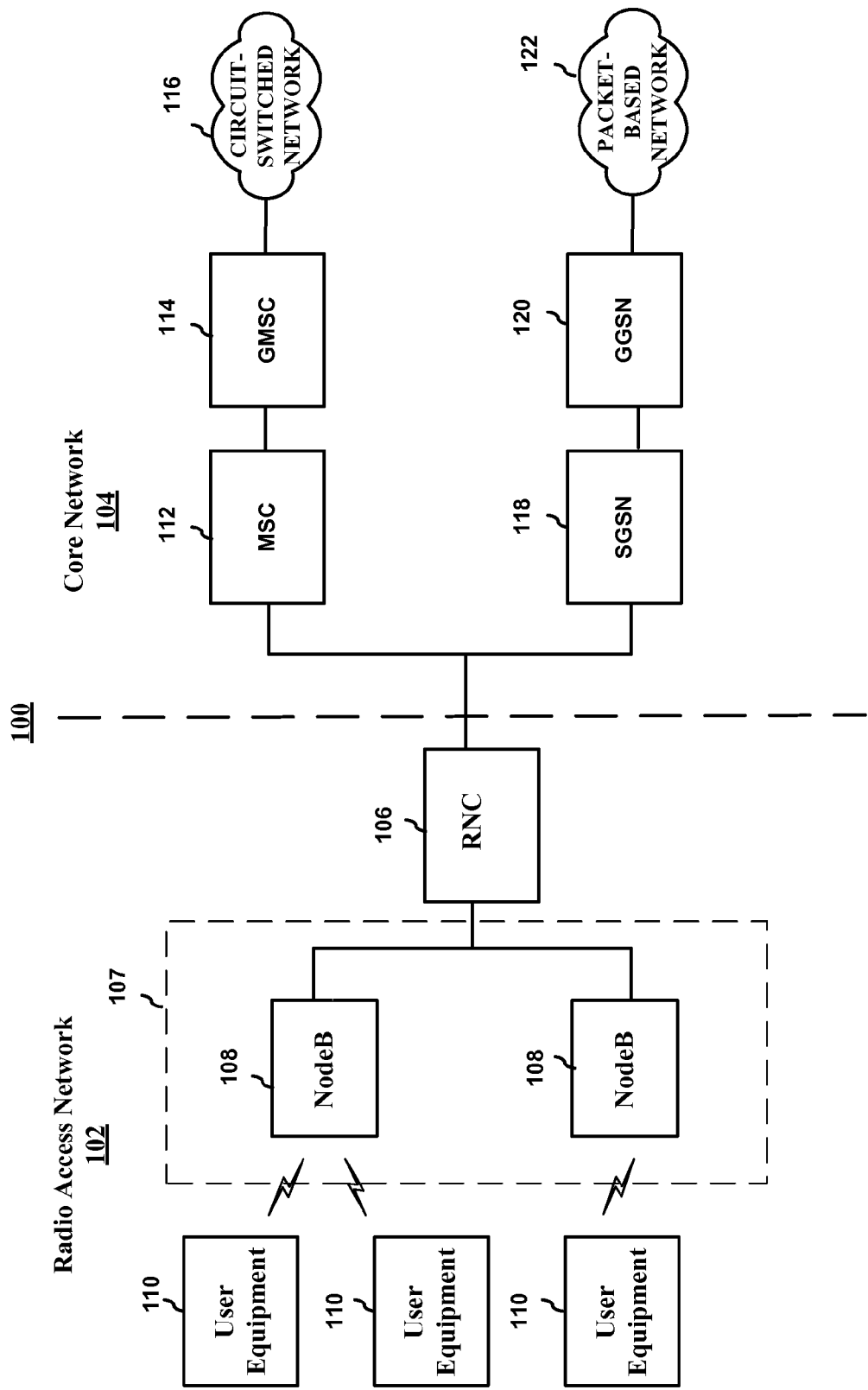
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs), such as an RNS 107, each controlled by a Radio Network Controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a Base Station (BS), a Base Transceiver Station (BTS), a radio base station, a radio transceiver, a transceiver function, a Basic Service Set (BSS), an Extended Service Set (ESS), an Access Point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a Session Initiation Protocol (SIP) phone, a laptop, a notebook, a netbook, a smartbook, a Personal Digital Assistant (PDA), a satellite radio, a Global Positioning System (GPS) device, a multimedia device, a video device, a digital audio player (e.g., MP3 player), a camera, a game console, or any other similar functioning device. The mobile apparatus is commonly referred to as User Equipment (UE) in UMTS applications, but may also be referred to by those skilled in the art as a Mobile Station (MS), a subscriber station, a mobile unit, a subscriber unit, a wireless unit, a remote unit, a mobile device, a wireless device, a wireless communications device, a remote device, a mobile subscriber station, an Access Terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a Mobile Switching Center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a Visitor Location Register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a Home Location Register (HLR) (not shown) containing subscriber data, such as the data reflecting the details of the services to which a particular user has subscribed. The HLR is also associated with an Authentication Center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a Time Division Duplexing (TDD), rather than a Frequency Division Duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
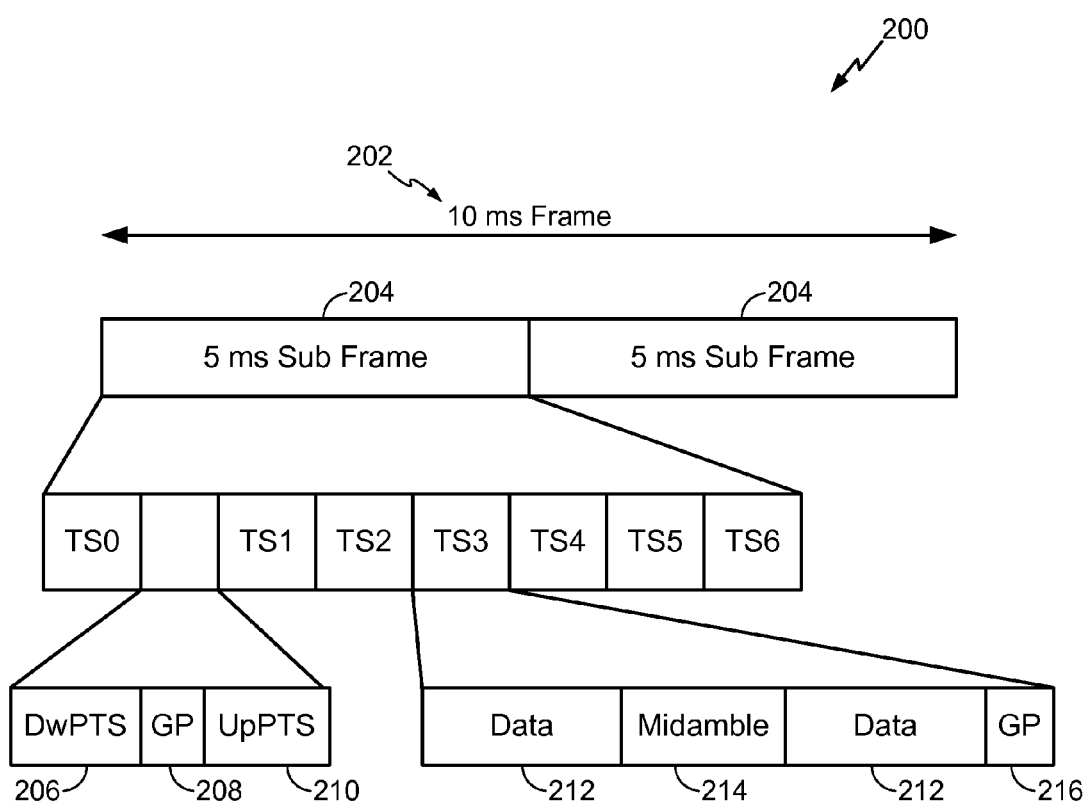
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206 (also referred to herein as the downlink pilot channel (DwPCH)), a guard period (GP) 208, and an uplink pilot time slot (UpPTS) 210 (also referred to herein as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
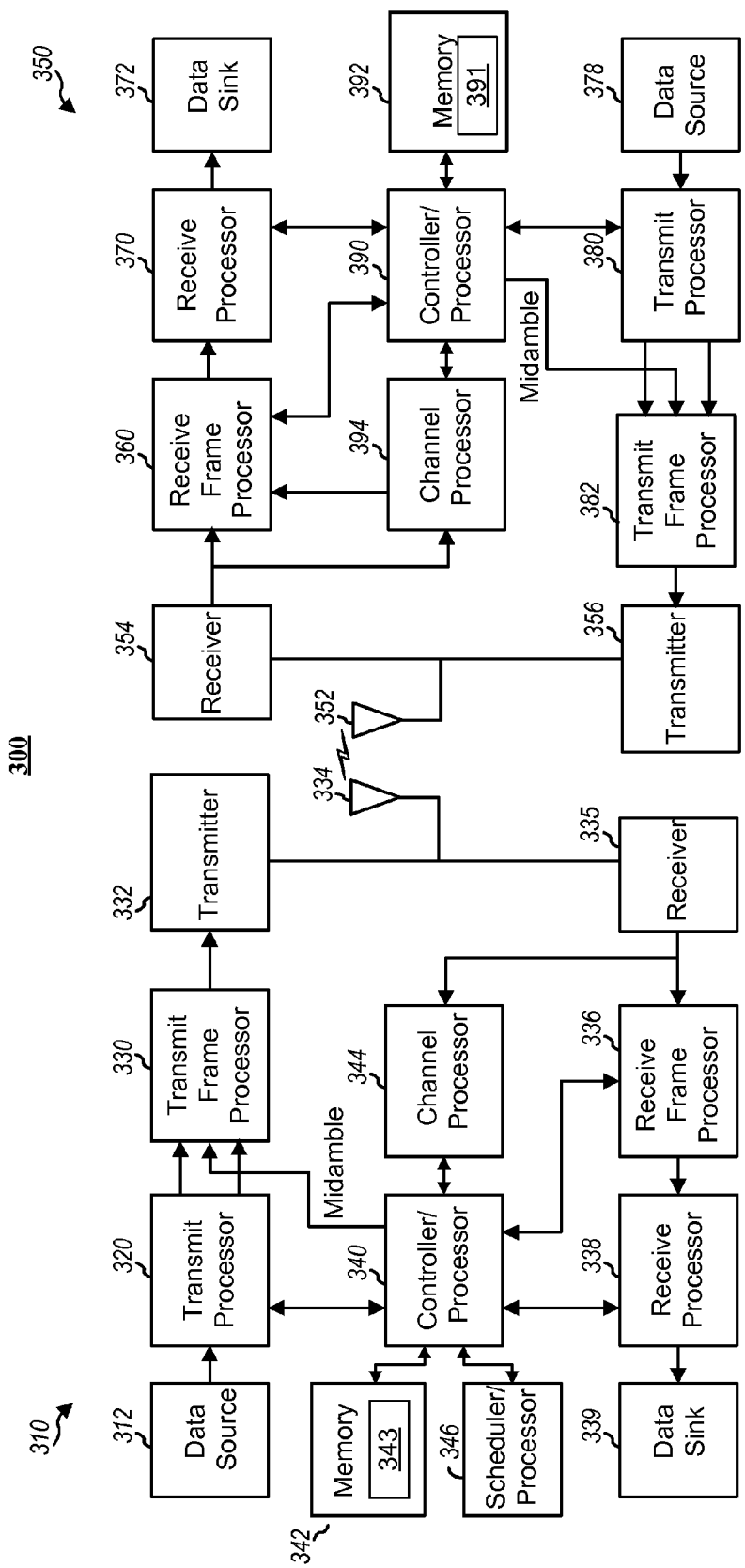
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide Cyclic Redundancy Check (CRC) codes for error detection, coding and interleaving to facilitate Forward Error Correction (FEC), mapping to signal constellations based on various modulation schemes (e.g., Binary Phase-Shift Keying (BPSK), Quadrature Phase-Shift Keying (QPSK), M-Phase-Shift Keying (M-PSK), M-quadrature Amplitude Modulation (M-QAM), and the like), spreading with Orthogonal Variable Spreading Factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an Acknowledgement (ACK) and/or Negative Acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an Acknowledgement (ACK) and/or Negative Acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a signal quality measurement module 391 that, when executed by the controller/processor 390, allows the UE 350 to measure the signal quality of the downlink pilot channels (DwPCH) of the various carrier frequencies. Similarly, the memory 342 of the node B 310 may store a synchronization module 343 that, when executed by the controller/processor 340, configures the node B 310 to transmit a downlink synchronization code on the downlink pilot channel of each carrier frequency of the multicarrier network. The memory 342 of the node B 310 may also store a signal quality analysis module that, when executed by the controller/processor 340, allows the node B 310 to analyze the different signal qualities of the measured carrier frequencies and cause transmission of a physical channel reconfiguration message to the UE to change carrier frequencies to the frequency having the better signal quality. A scheduler/processor 346 at the node B 310 may be used to allocate resources to the UEs and schedule downlink and/or uplink transmissions for the UEs.

In order to provide more capacity, the TD-SCDMA system may allow multiple carrier signals or frequencies. Assuming that N is the total number of carriers, the carrier frequencies may be represented by the set $\{F(i), i=0, 1, \ldots, N-1\}$, where the carrier frequency, $F(0)$, is the primary carrier frequency and the rest are secondary carrier frequencies. For example, a cell can have three carrier signals whereby the data can be transmitted on some code channels of a time slot on one of the three carrier signal frequencies. FIG. 4 is a block diagram conceptually illustrating carrier frequencies 40 in a multicarrier TD-SCDMA communication system. The multiple carrier frequencies include a primary carrier frequency 400 ($F(0)$), and two secondary carrier frequencies 401 and 402 ($F(1)$ and $F(2)$). In such multi-carrier systems, the system overhead is transmitted on the first time slot (TS0) of the primary carrier frequency 400. In the first time slot (TS0) of the primary carrier frequency 400, the Primary Common Control Physical Channel (P-CCPCH), the Secondary Common Control Physical Channel (S-CCPCH), the Paging Indicator Channel (PICH), and the like are transmitted. The traffic channels (e.g., Downlink Dedicated Physical Channels (DL DPCHs)) may then be carried on the remaining time slots (TS4-TS6) of the primary carrier frequency 400 and on all downlink time slots (TS0 and TS4-TS6) of the secondary carrier frequencies 401 and 402. Therefore, in such configurations, a UE will receive system information and monitor the paging messages on the primary carrier frequency 400 while transmitting and receiving data on either one or all of the primary carrier frequency 400 and the secondary carrier frequencies 401 and 402.

It should be noted that the DwPTS and UpPTS may be configured on the primary carrier frequency 400 and the secondary carrier frequencies 401 and 402. However, a random access procedure may be performed with the primary carrier frequency 400, while the handover uplink synchronization procedure may be performed with either or both of the primary carrier frequency 400 and the secondary carrier frequencies 401 and 402. Additionally, a downlink (DL) synchronization (sync) code 403 is transmitted by the node B on each of the primary carrier frequency 400 and the secondary carrier frequencies 401 and 402. Downlink sync codes, such as DL sync code 403 are often used to identify the particular node B and to perform synchronization with that node B. Currently, the TD-SCDMA standards provide for such downlink sync codes to be transmitted on the primary carrier frequency of multicarrier systems. However, in the various aspects of the present disclosure, the DL sync code 403 is transmitted on each of the carrier frequencies in the mobile system.

The current TD-SCDMA standards also provide certain metrics of signal quality: (1) the receive signal code power (RSCP) of P-CCPCH; (2) the timeslot interference signal code power (ISCP), which is the interference on the received signal in a specified timeslot measured on the midamble; and (3) the signal-to-interference ratio (SIR) on the received power on the code of a specified Dedicated Physical Channel (DPCH) or High Speed—Physical Downlink Shared Channel (HS-PDSCH). The timeslot ISCP and SIR can only be measured when there is a dedicated traffic channel. Without a dedicated traffic channel, the RSCP of the P-CCPCH is often selected for measurement. However, in a multicarrier TD-SCDMA system, the P-CCPCH resides only on the primary frequency. Therefore, without a dedicated traffic channel, a UE cannot measure signal quality of the secondary frequencies.

FIG. 5A is a functional block diagram conceptually illustrating example blocks executed by a UE to implement one aspect of the present disclosure. In block 500, a UE receives an indication from a node B to measure the signal quality on one of the carrier frequencies in a multicarrier radio access network. The UE measures the signal quality of the carrier frequency, in block 501, based on a downlink synchronization code transmitted on the downlink pilot channel of the measured carrier frequency.

FIG. 5B is a functional block diagram conceptually illustrating example blocks executed by a node B to implement one aspect of the present disclosure. In block 502, the node B transmits a DL sync code in the DwPTS on each of the carrier frequencies of the multicarrier radio access network. The node B then transmits an indication, in block 503, to the UE to measure a signal quality on one of the carrier frequencies in the network.

In this aspect of the present disclosure, while all of the carrier frequencies may not carry a dedicated downlink control channel, such as P-CCPCH, to measure, they each do carry a downlink pilot channel (DwPCH), and the node B transmits a DL sync code not only on the DwPCH of the primary carrier frequency, but also on the DwPCH of each of the secondary carrier frequencies. Therefore, regardless of whether the UE is instructed to measure the primary carrier frequency, with the dedicated control channel, or one of the secondary frequencies, without a dedicated control channel, the signal quality may still be measured. Two new metrics are defined for the signal quality measurement: (1) DwPCH RSCP: The received power of a DwPCH on a given frequency; and (2) DwPCH SIR: The receive SIR of a DwPCH on a given carrier frequency.

With the above two new metrics, the network can command the UE to measure one or more frequencies and report the results to the network which can optimize the allocation of resources on the best possible frequency. The UE typically is allocated to send and receive on a particular frequency of the DPCH and single-frequency HS-PDSCH, but may switch to another frequency with a better radio channel. In such cases, the network can cause the UE to measure and report the DwPCH RSCP and/or SIR. Based on these signal quality metrics, the network can prompt the UE to switch to another frequency. In this manner the UE may measure one or more of the primary frequency or secondary frequencies.

Figure 6:
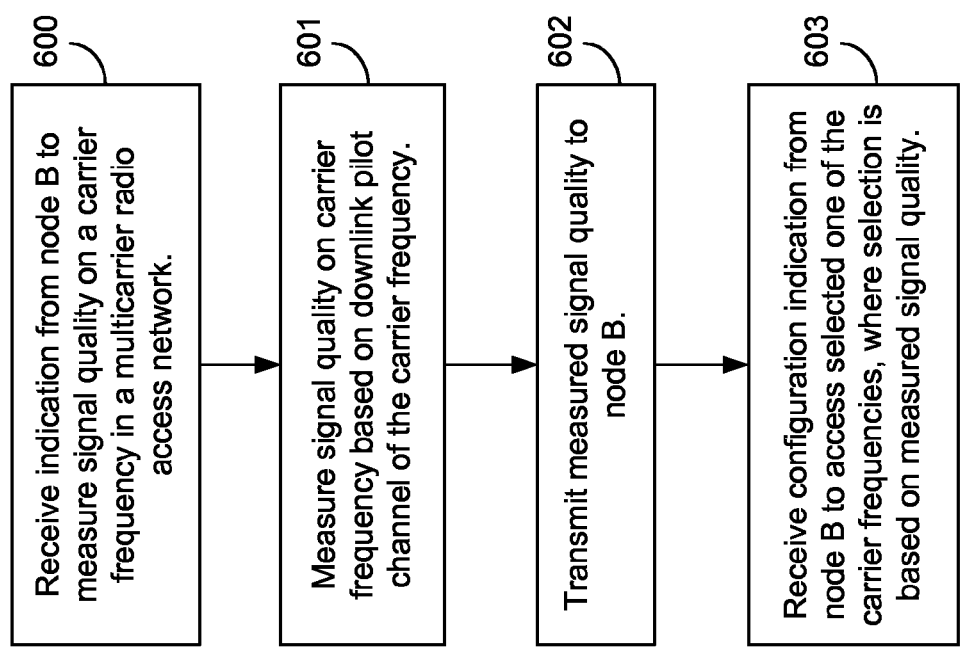
FIG. 6 is a functional block diagram conceptually illustrating example blocks executed to implement one aspect of the present disclosure.

FIG. 6 is a functional block diagram conceptually illustrating example blocks executed to implement one aspect of the present disclosure. In block 600, a UE receives an indication from a node B to measure the signal quality using DL sync codes transmitted on one of the carrier frequencies in a multicarrier radio access network. The UE measures the signal quality, in block 601, on the carrier frequency based on the DL sync code on a downlink pilot channel of the measured carrier frequency. In block 602, the UE transmits the measured signal quality report to the node B. The UE then, in block 603, receives a configuration indication from the node B to access a selected one of the carrier frequencies, where the selection is based on the measured signal quality.

Figure 7:
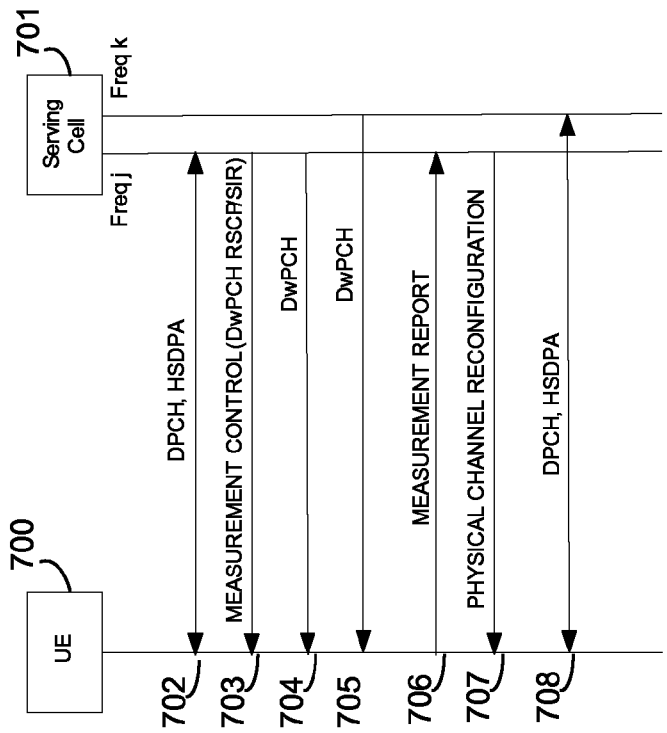
FIG. 7 is a call flow diagram conceptually illustrating a call flow occurring between a UE and a serving cell in a multicarrier system configured according to one aspect of the present disclosure.

FIG. 7 is a call flow diagram conceptually illustrating a call flow 70 occurring between a UE 700 and a serving cell 701 in a multicarrier system configured according to one aspect of the present disclosure. The serving cell 701 provides communication with the UE 700 over multiple carrier frequencies, frequency j and frequency k. At time 702, data communication occurs over DPCH and HSDPA between the UE 700 and the serving cell 701. At time 703, the UE 700 receives a measurement control indication from the serving cell 701 directing the UE 700 to measure the DwPCH RSCP/SIR of the different carrier frequencies, frequency j and k. At time 704, the UE 700 measures the signal quality of frequency j using the DL sync code transmitted on the DwPCH of frequency j and then, at time 705, measures the signal quality of frequency k using the DL sync code transmitted on the DwPCH of frequency k. The UE 700 reports these signal quality measurements to the serving cell 701, at time 706, in a measurement report message. The serving cell 701 will then analyze the signal quality measurements to determine the better carrier frequency for the UE 700 to use. At time 707, the serving cell 701 sends a physical channel reconfiguration indication to the UE 700, indicating that frequency k is the desired carrier frequency to use. Thus, at time 708, the UE 700 begins data communication with the serving cell 701 using frequency k.

Figure 8:
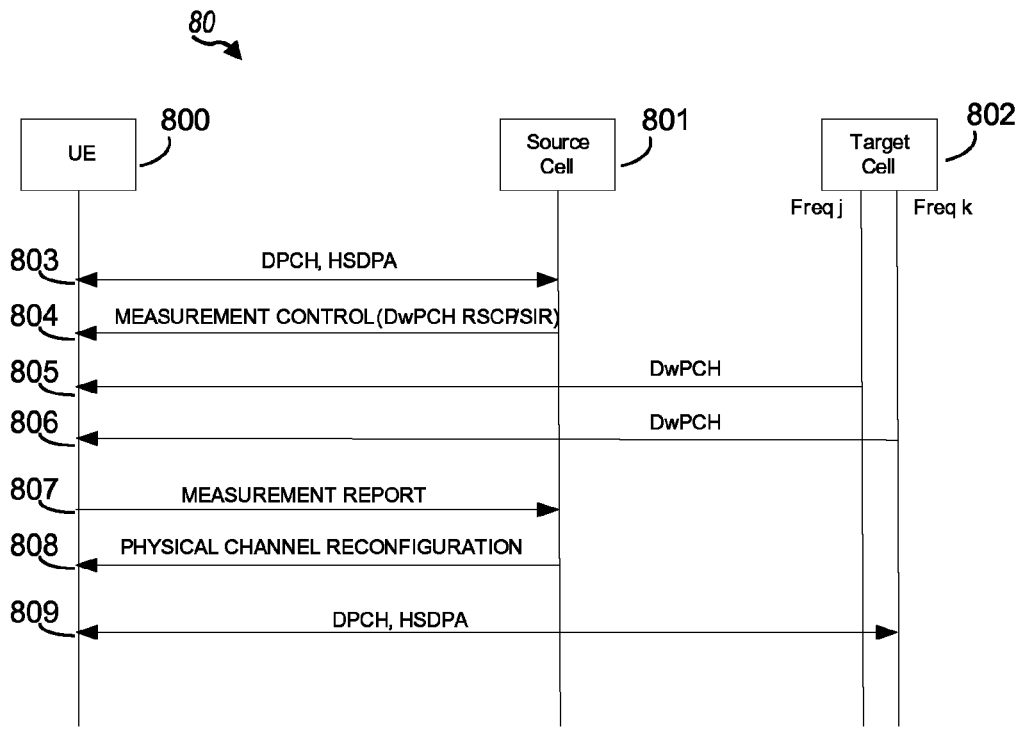
FIG. 8 is a call flow diagram conceptually illustrating a call flow in a multicarrier system configured according to one aspect of the present disclosure.

It should be noted that in additional aspects of the present disclosure, this signal quality process may be used during handover procedures. FIG. 8 is a call flow diagram conceptually illustrating a call flow 80 in a multicarrier system configured according to one aspect of the present disclosure. At time 803, a UE 800 maintains data communication with a source cell 801 using DPCH and HSDPA. The UE 800 is reaching a point where a handover will be necessary to a target cell 802. Prior to handover, the UE 800 receives a measurement control indication, at time 804, from the source cell 801 to measure the signal quality of the carrier frequencies, frequencies j and k, at the target cell 802. At time 805, the UE 800 measures the signal quality of frequency j using the DL sync code transmitted on the DwPCH of frequency j of the target cell 802 and then, at time 806, measures the signal quality of frequency k using the DL sync code transmitted on the DwPCH of frequency k of the target cell 802. The UE 800 transmits a measurement report to the source cell 801 at time 807. After analyzing the measurement report, the source cell 801 sends a physical channel reconfiguration at time 808, which commands the UE 800 to handover to the carrier frequency k that is the better of the carrier frequencies at the target cell 802. At time 809, the UE 800 completes handover to the target cell 802 by establishing data communication using the carrier frequency k at the target cell 802.

It should also be noted that, in further additional aspects of the present disclosure, the network can prompt a UE operating in multi-frequency HSDPA to determine the signal quality of each of the carrier frequencies in the multi-frequency operation. When some frequencies exhibit a better signal quality, such as through the DwPCH RSCP or SIR, the network may dynamically allocate the UE to receive on these frequencies using a High-Speed Shared Control Channel (HS-SCCH).

Figure 9:
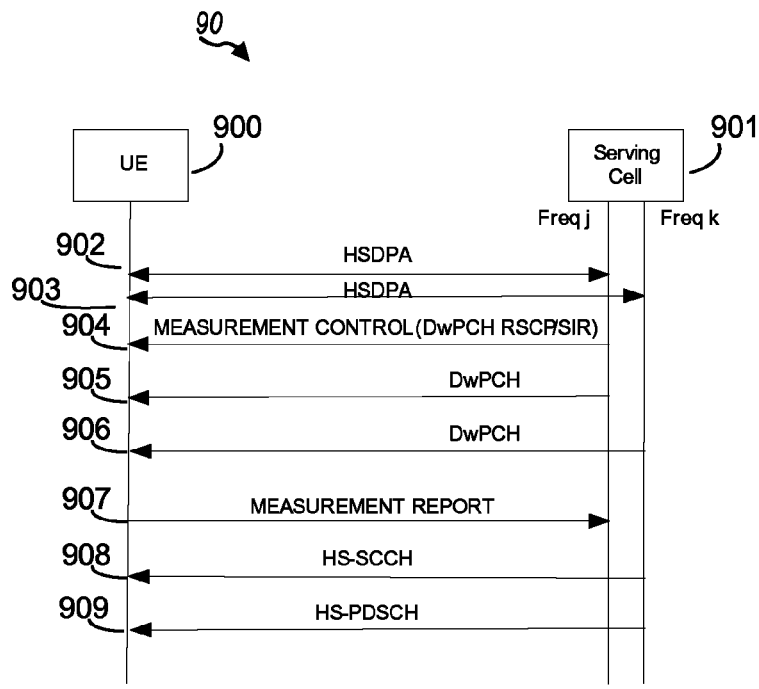
FIG. 9 is a call flow diagram conceptually illustrating a call flow within a multicarrier network configured according to one aspect of the present disclosure.

FIG. 9 is a call flow diagram conceptually illustrating a call flow 90 within a multicarrier network configured according to one aspect of the present disclosure. A UE 900 maintains multi-frequency, High Speed Data Communication (HSDPA) with a serving cell 901, at times 902 and 903, over both carrier frequencies j and k. At time 904, the service cell 901 transmits a measurement control indication to the UE 900 to measure the signal qualities of the two carrier frequencies, j and k. At time 905, the UE 900 measures the signal quality of frequency j using the DL sync code transmitted on the DwPCH of frequency j and then, at time 906, measures the signal quality of the DwPCH from frequency k using the DL sync code transmitted on the DwPCH of frequency k. The UE 900 sends a measurement report, at time 907, to the serving cell 901. After analyzing the measurement report and signal qualities measured from the UE 900, the serving cell 901 signals the allocation of high speed downlink data, at time 908, through the High Speed-Shared Control Channel (HS-SCCH), and then begins transmitting high speed downlink data, at time 909, through the HS-PDSCH. Thus, the serving cell 901 is able to dynamically allocate high speed data operations with the UE 900 on the frequencies that exhibit the better signal qualities.

In one configuration, the apparatus, such as the UE 350, configured for wireless communication includes means for receiving an indication from a node B to measure a signal quality on one of the carrier frequencies in a multicarrier radio access network and means for measuring the signal quality on the carrier frequency based on a downlink pilot channel of the measured carrier frequency. In one aspect, the aforementioned means may be the antennas 352, the receiver 354, the receive frame processor 360, the channel processor 394, the receive processor 370, the controller/processor 390, and the signal quality measurement module 391 configured to perform the functions recited by the aforementioned means. In another aspect, the aforementioned means may be a module or any apparatus configured to perform the functions recited by the aforementioned means.

In another configuration, the apparatus, such as the node B 310, configured for wireless communication includes means for transmitting a DL synchronization code on a downlink pilot channel of each carrier frequency of the multicarrier radio access network and means for transmitting an indication to a UE to measure a signal quality on one of the carrier frequencies. In one aspect, the aforementioned means may be the antennas 334, the transmitter 332, the transmit frame processor 330, the channel processor 334, the transmit processor 320, the controller/processor 340, and the memory 342 storing a synchronization module 343 all of which are configured together to perform the functions recited by the aforementioned means. In another aspect, the aforementioned means may be a module or any apparatus configured to perform the functions recited by the aforementioned means.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication in a multicarrier time division-synchronous code division multiple access (TD-SCDMA) network, comprising:
    receiving one of a plurality of downlink (DL) synchronization codes to identify a base station and perform synchronization with the base station, the downlink synchronization codes transmitted from a node B, the downlink synchronization codes transmitted on a downlink pilot channel (DwPCH) of a primary carrier frequency and DwPCHs of secondary carrier frequencies to perform the synchronization with either or both of the primary carrier frequency and a secondary carrier frequency of the secondary carrier frequencies;
    receiving an indication from the node B to measure a signal quality on at least one carrier frequency of a plurality of carrier frequencies in said multicarrier radio access network using the received downlink (DL) synchronization code; and
    measuring said signal quality on said at least one carrier frequency based on the received downlink synchronization code.

2. The method of claim 1 further comprising:
    transmitting the measured signal quality to said node B.

3. The method of claim 1 further comprising:
    receiving a configuration indication from said node B to access a selected one of said plurality of carrier frequencies based on the measured signal quality.

4. The method of claim 3, wherein:
    the wireless communication comprises high-speed downlink packet access (HSDPA) communication in the TD-SCDMA network;
    the command further includes instructions to measure the signal quality on each of the plurality of carrier frequencies using the DL synchronization code of the DwPCH of each of the plurality of carrier frequencies;

the measuring comprises measuring the DL synchronization code of the DwPCH of each of the plurality of carrier frequencies;

the configuration indication is based on the measured signal quality of each of the plurality of carrier frequencies; and the configuration indication is received using a high-speed shared control channel (HS-SCCH).

5. The method of claim 1 wherein said signal quality comprises at least one of:
a DwPCH received signal code power; and
a DwPCH signal-to-interference ratio.

6. A user equipment (UE) configured for wireless communication in a multicarrier time division-synchronous code division multiple access (TD-SCDMA) network, said UE comprising:

means for receiving one of a plurality of downlink (DL) synchronization codes to identify a base station and perform synchronization with the base station, the downlink synchronization codes transmitted from a node B, the downlink synchronization codes transmitted on a downlink pilot channel (DwPCH) of a primary carrier frequency and DwPCHs of secondary carrier frequencies to perform the synchronization with either or both of the primary carrier frequency and a secondary carrier frequency of the secondary carrier frequencies;

means for receiving an indication from the node B to measure a signal quality on at least one carrier frequency of a plurality of carrier frequencies in said multicarrier radio access network using the received downlink (DL) synchronization code; and means for measuring said signal quality on said at least one carrier frequency based on the received downlink synchronization code.

7. The UE of claim 6 further comprising:
means for receiving a configuration indication from said node B to access a selected one of said plurality of carrier frequencies based on the measured signal quality.

8. The UE of claim 7, wherein:
the wireless communication comprises high-speed downlink packet access (HSDPA) communication in the TD-SCDMA network;
the command further includes instructions to measure the signal quality on each of the plurality of carrier frequencies using the DL synchronization code of the DwPCH of each of the plurality of carrier frequencies;
the means for measuring comprises means for measuring the DL synchronization code of the DwPCH of each of the plurality of carrier frequencies;
the configuration indication is based on the measured signal quality of each of the plurality of carrier frequencies; and
the configuration indication is received using a high-speed shared control channel (HS-SCCH).

9. A computer program product, comprising:
a non-transitory computer-readable medium having program code recorded thereon, said program code comprising:
program code to receive one of a plurality of downlink (DL) synchronization codes to identify a base station and perform synchronization with the base station, the downlink synchronization codes transmitted from a node B, the downlink synchronization codes transmitted on a downlink pilot channel (DwPCH) of a primary carrier frequency and DwPCHs of secondary carrier frequencies to perform the synchronization with either or both of the primary carrier frequency and a secondary carrier frequency of the secondary carrier frequencies;

program code to receive an indication from the node B of a time division-synchronous code division multiple access (TD-SCDMA) network to measure a signal quality on at least one carrier frequency of a plurality of carrier frequencies in said multicarrier radio access network using the received downlink (DL) synchronization code; and program code to measure said signal quality on said at least one carrier frequency based on the received downlink synchronization code.

10. The computer program product of claim 9, said program code further comprising:
program code to receive a configuration indication from said node B to access a selected one of said plurality of carrier frequencies based on the measured signal quality.

11. The computer program product of claim 10, wherein:
the TD-SCDMA network enables high-speed downlink packet access (HSDPA) communications;
the command further includes instructions to measure the signal quality on each of the plurality of carrier frequencies using the DL synchronization code of the DwPCH of each of the plurality of carrier frequencies;
the program code to measure comprises program code to measure the DL synchronization code of the DwPCH of each of the plurality of carrier frequencies;
the configuration indication is based on the measured signal quality of each of the plurality of carrier frequencies; and
the configuration indication is received using a high-speed shared control channel (HS-SCCH).

12. A user equipment (UE) configured for wireless communication in a time division-synchronous code division multiple access (TD-SCDMA) network, said UE comprising:
at least one processor; and
a memory coupled to the at least one processor, wherein said at least one processor is configured:
to receive one of a plurality of downlink (DL) synchronization codes transmitted from a node B, the downlink synchronization codes to identify a base station and perform synchronization with the base station, the downlink synchronization codes transmitted on a downlink pilot channel (DwPCH) of a primary carrier frequency and DwPCHs of secondary carrier frequencies to perform the synchronization with either or both of the primary carrier frequency and a secondary carrier frequency of the secondary carrier frequencies;
to receive an indication from the node B to measure a signal quality on at least one carrier frequency of a plurality of carrier frequencies in said multicarrier radio access network using the received downlink (DL) synchronization code; and
to measure said signal quality on said at least one carrier frequency based on the received downlink synchronization code.

13. The UE of claim 12, said at least one processor further configured:
to transmit the measured signal quality to said node B.

14. The UE of claim 13, wherein:
the wireless communication comprises high-speed downlink packet access (HSDPA) communication in the TD-SCDMA network;

the command further includes instructions to measure the signal quality on each of the plurality of carrier frequencies using the DL synchronization code of the DwPCH of each of the plurality of carrier frequencies;

the means for measuring comprises means for measuring the DL synchronization code of the DwPCH of each of the plurality of carrier frequencies;

the configuration indication is based on the measured signal quality of each of the plurality of carrier frequencies; and the configuration indication is received using a high-speed shared control channel (HS-SCCH).

15. The UE of claim 12, said at least one processor further configured:
to receive a configuration indication from said node B to access a selected one of said plurality of carrier frequencies based on the measured signal quality.

16. The UE of claim 12 wherein said signal quality comprises at least one of:
a DwPCH received signal code power; and
a DwPCH signal-to-interference ratio.

17. A method for wireless communication in a multicarrier time division-synchronous code division multiple access (TD-SCDMA) network, comprising:
transmitting a downlink (DL) synchronization code on a downlink pilot channel (DwPCH) of a primary carrier frequency and DwPCHs of each frequency of a plurality of secondary carrier frequencies in said multicarrier TD-SCDMA network, to identify a base station and to synchronize with the base station with either or both of the primary carrier frequency and a secondary carrier frequency of the secondary carrier frequencies; and
transmitting a command to a user equipment (UE) to measure a signal quality on at least one of said plurality of carrier frequencies based on the downlink synchronization code transmitted on the DwPCH of the at least one carrier frequency.

18. The method of claim 17 further comprising:
receiving the measured signal quality from said UE.

19. The method of claim 17 further comprising:
transmitting a configuration indication to said UE to access a selected one of said plurality of carrier frequencies based on the measured signal quality.

20. The method of claim 19, wherein:
the wireless communication comprises high-speed downlink packet access (HSDPA) communication in the TD-SCDMA network;
the command further includes instructions to measure the signal quality on each of the plurality of carrier frequencies using the DL synchronization code of the DwPCH of each of the plurality of carrier frequencies;
the configuration indication is based on the measured signal quality of each of the plurality of carrier frequencies; and
the configuration indication is transmitted using a high-speed shared control channel (HS-SCCH).

21. The method of claim 17 wherein said signal quality comprises at least one of:
a DwPCH received signal code power; and
a DwPCH signal-to-interference ratio.

22. A node B configured for wireless communication in a multicarrier time division-synchronous code division multiple access (TD-SCDMA) network, said node B comprising:
means for transmitting a downlink (DL) synchronization code on a downlink pilot channel (DwPCH) of a primary carrier frequency and DwPCHs of each frequency of a plurality of secondary carrier frequencies in said multicarrier TD-SCDMA network, to identify a base station and to synchronize with the base station with either or both of the primary carrier frequency and a secondary carrier frequency of the secondary carrier frequencies; and means for transmitting a command to a user equipment (UE) to measure a signal quality on at least one of said plurality of carrier frequencies based on the downlink synchronization code transmitted on the DwPCH of the at least one carrier frequency.

23. The node B of claim 22 further comprising:
means for transmitting a configuration indication to said UE to access a selected one of said plurality of carrier frequencies based on the measured signal quality.

24. The node B of claim 23, wherein:
the wireless communication comprises high-speed downlink packet access (HSDPA) communication in the TD-SCDMA network;
the command further includes instructions to measure the signal quality on each of the plurality of carrier frequencies using the DL synchronization code of the DwPCH of each of the plurality of carrier frequencies;
the configuration indication is based on the measured signal quality of each of the plurality of carrier frequencies; and
the configuration indication is transmitted using a high-speed shared control channel (HS-SCCH).

25. A
non-transitory computer-readable medium having program code recorded thereon, said program code comprising:
program code to transmit a downlink (DL) synchronization code on a downlink pilot channel (DwPCH) of a primary carrier frequency and DwPCHs of each frequency of a plurality of secondary carrier frequencies in said multicarrier TD-SCDMA network, to identify a base station and to synchronize with the base station with either or both of the primary carrier frequency and a secondary carrier frequency of the secondary carrier frequencies; and
program code to transmit a command to a user equipment (UE) to measure a signal quality on at least one of said plurality of carrier frequencies based on the downlink synchronization code transmitted on the DwPCH of the at least one carrier frequency.

26. The computer program product of claim 25, said program code further comprising:
program code to transmit a configuration indication to said UE to access a selected one of said plurality of carrier frequencies based on the measured signal quality.

27. The computer program product of claim 26, wherein:
the TD-SCDMA network enables high-speed downlink packet access (HSDPA) communications;
the command further includes instructions to measure the signal quality on each of the plurality of carrier frequencies using the DL synchronization code of the DwPCH of each of the plurality of carrier frequencies;
the configuration indication is based on the measured signal quality of each of the plurality of carrier frequencies; and
the configuration indication is transmitted using a high-speed shared control channel (HS-SCCH).

28. A node B configured for wireless communication in a multicarrier time division-synchronous code division multiple access (TD-SCDMA) network, said comprising:
- at least one processor; and
- a memory coupled to the at least one processor, wherein said at least one processor is configured:
  - to transmit a downlink (DL) synchronization code on a downlink pilot channel (DwPCH) of a primary carrier frequency and DwPCHs of each frequency of a plurality of secondary carrier frequencies in said multicarrier TD-SCDMA network, to identify a base station and to synchronize with the base station with either or both of the primary carrier frequency and a secondary carrier frequency of the secondary carrier frequencies; and
  - to transmit a command to a user equipment (UE) to measure a signal quality on at least one of said plurality of carrier frequencies based on the downlink synchronization code transmitted on the DwPCH of the at least one carrier frequency.

29. The node B of claim 28, said at least one processor further configured:
- to receive the measured signal quality from said UE.

30. The node B of claim 28, said at least one processor further configured:
- to transmit a configuration indication to said UE to access a selected one of said plurality of carrier frequencies based on the measured signal quality.

31. The node B of claim 30, wherein:
- the wireless communication comprises high-speed downlink packet access (HSDPA) communication in the TD-SCDMA network;
- the command further includes instructions to measure the signal quality on each of the plurality of carrier frequencies using the DL synchronization code of the DwPCH of each of the plurality of carrier frequencies;
- the configuration indication is based on the measured signal quality of each of the plurality of carrier frequencies; and
- the configuration indication is transmitted using a high-speed shared control channel (HS-SCCH).

32. The node B of claim 28 wherein said signal quality comprises at least one of:
- a DwPCH received signal code power; and
- a DwPCH signal-to-interference ratio.

* * * * *